(12) United States Patent
Kim

(10) Patent No.: US 7,717,033 B1
(45) Date of Patent: May 18, 2010

(54) NUT CRACKING MECHANISM FOR VARIABLE-SIZED NUTS

(76) Inventor: Sun Y. Kim, 2384 Lancaster Ct., Hayward, CA (US) 94542

( * ) Notice: Subject to any disclaimer, the term of this patent is extended or adjusted under 35 U.S.C. 154(b) by 1306 days.

(21) Appl. No.: 11/204,899

(22) Filed: Aug. 16, 2005

Related U.S. Application Data

(60) Provisional application No. 60/612,002, filed on Sep. 22, 2004.

(51) Int. Cl.
*A23N 5/00* (2006.01)

(52) U.S. Cl. .............................. 99/574; 99/579; 99/581

(58) Field of Classification Search ........... 99/571–580, 99/581–583, 568, 600–604, 609–611, 617–623, 99/625, 628; 241/242, 227; 426/481–483
See application file for complete search history.

(56) References Cited

U.S. PATENT DOCUMENTS

| | | | | |
|---|---|---|---|---|
| 1,330,442 A | * | 2/1920 | Futch | 99/575 |
| 1,834,347 A | * | 12/1931 | Nixon | 99/579 |
| 2,144,841 A | * | 1/1939 | Glaser | 99/574 |
| 2,226,272 A | * | 12/1940 | Wadsworth | 99/579 |
| 2,324,272 A | * | 7/1943 | Anderson | 15/179 |
| 2,954,810 A | * | 10/1960 | MacCloygston Bond | 99/574 |
| 4,353,931 A | * | 10/1982 | Volk, Sr. | 426/483 |
| 4,438,688 A | * | 3/1984 | Johnson | 99/574 |
| 4,515,076 A | * | 5/1985 | Reznik | 99/571 |
| 4,793,248 A | | 12/1988 | Frederiksen et al. | |
| 5,070,617 A | | 12/1991 | Frederiksen et al. | |
| 5,115,733 A | | 5/1992 | Frederiksen et al. | |
| 5,247,879 A | | 9/1993 | Frederiksen et al. | |
| 5,415,085 A | * | 5/1995 | Thomson | 99/574 |
| 5,505,123 A | * | 4/1996 | Kim | 99/579 |

* cited by examiner

*Primary Examiner*—Timothy F. Simone
(74) *Attorney, Agent, or Firm*—Richard Esty Peterson Patent Attorney

(57) ABSTRACT

A nut cracking mechanism for shelling variable-sized nuts having a brittle shell and fragile nut meat, the nut cracker mechanism having a housing with a horizontally positioned rotatable drum contained in the housing, and an adjustable, substantially vertical compression plate mounted in the housing with a cracking surface displaced from a cylindrical slip resistant cracking surface of the drum to form a narrowing gap between the drum and the compression plate, the gap having an upper portion sized to accommodate nuts of varying sizes and a lower portion sized to compress nuts between the cylindrical surface of the drum and the compression plate until the nut cracks and releases its meat, the mechanism having associated components to feed nuts to the top of the mechanism and receive shells and meat from the bottom of the mechanism.

15 Claims, 2 Drawing Sheets

NUT CRACKING MECHANISM FOR VARIABLE-SIZED NUTS

RELATED APPLICATION

This application claims the benefit of my provisional application of the same title, Ser. No. 60/612,002, filed Sep. 22, 2004.

BACKGROUND OF THE INVENTION

This invention relates to a nut cracking mechanism, and in particular to a nut cracker, that accommodates a nut having a hard or brittle shell with a fragile meat, such as a walnut or pecan. The nut cracker is also of a type that accommodates nuts of varying size, thereby minimizing pre-sort operations.

Different nuts often require different types of mechanisms to effectively remove the shell from the internal kernel. This inventor has experience in devising nut cracking machines for the thick shell macadamia nut. Different nut cracking machines are disclosed in my patents including, Kim, U.S. Pat. No. 5,505,123, issued Apr. 9, 1996, for Nut Cracking Apparatus; and Fredericksen, et al., U.S. Pat. No. 5,247,879, issued Sep. 28, 1993, for Nut Cracking Machine.

Typically, a nut is compressed between two surfaces with sufficient force to crack or fracture the shell sufficiently to release the nut with minimum damage to the internal meat. Shelled nuts that are whole and undamaged command a greater sale price than fragmented nuts and nut pieces.

In a commercial nut shelling operation, a continuous feed of prepared nuts are supplied to one or more cracking and shelling machines which fracture the nut shell so that the nut can be separated from the shell. In general, separating the released meat from the shell and shell debris is accomplished in a subsequent stage from the cracking operation.

Certain nuts, such as walnuts and pecans, have brittle relatively thin shells. This class of nut has a bifurcated kernel with a fibrous membrane separating all but an interconnecting bridge between the two nearly identical halves. In the shelling operation, it is preferred that the kernel is split into halves in order that the membrane can be separated from the meat and discarded with the shells. For this class of nut, recovery of a minimally damaged half-kernel is preferred. Because of the thin brittle shells and irregularly shaped kernel, shelling of this type of nut with a high percentage of minimally damaged half-kernels is a challenge.

SUMMARY OF THE INVENTION

The nut cracking mechanism of this invention is particularly designed to shell walnuts and other similar nuts having a brittle outer shell and a complex kernel that is easily damaged. With minor modification, the nut cracking mechanism can be adapted to shell other nuts that are amenable to cracking under applied pressure.

The nut cracking mechanism of this invention is also designed to shell nuts in a continuous shelling operation and can accommodate nuts of different sizes. The shelling mechanism can be modified by expanding its width or by ganging multiple units, where increased capacity is required. Where multiple units are ganged, the nuts can be presorted as to size and each unit adjusted to improve the percent of undamaged shelled meat. However, the nut cracking mechanism has a wedge-shape cracking zone that is configured to engage and crack nuts in a range of varying sizes.

The nut cracking mechanism of this invention includes a structural housing for rotatably mounting a horizontally positioned feed roller or drum, having a nonskid surface that rotates in proximity to a compression plate. The compression plate is preferably curved with a radius of curvature greater than the radius of the cylindrical feed roller.

The nonskid cracking surface of the feed roller forces the nut against the cracking surface of the compression plate and prevents a nut from slipping out of engagement when transported to the cracking zone with the narrowing gap between roller and plate. The nonskid cracking surface of the roller may be corrugated, knurled or otherwise textured by casting, milling or laminating. For use in shelling walnuts, a diamond aperture screen was welded and secured to a smooth drum with the elongated diamond apertures horizontally oriented with the long axis parallel to the axis of the cylindrical drum. The use of a replaceable sleeve that is keyed to the drum to prevent independent rotation is advantageous for tailoring the nonskid surface to a particular nut type and to facilitate cleaning of the screen and drum when the screen is removed. No special treatment is required for the surface of the compression plate.

Additionally, the preferred embodiment of the nut cracking mechanism has an adjustable cracking or compression plate to allow the position of the plate to be adjusted for different nuts, or to fine tune the unit for particular types or batches of nuts. In this manner, the narrowing gap between the cracking surface of the compression plate and the skid resistant cracking surface of the drum is variable.

In the preferred embodiment described, the nut cracking mechanism is combined with a vibratory feed unit to form a shelling station system in a continuous shelling operation. It is to be understood that this and other components may be added or omitted according to the needs of the shelling operation.

DETAILED DESCRIPTION OF THE PREFERRED EMBODIMENTS

Figure 1:
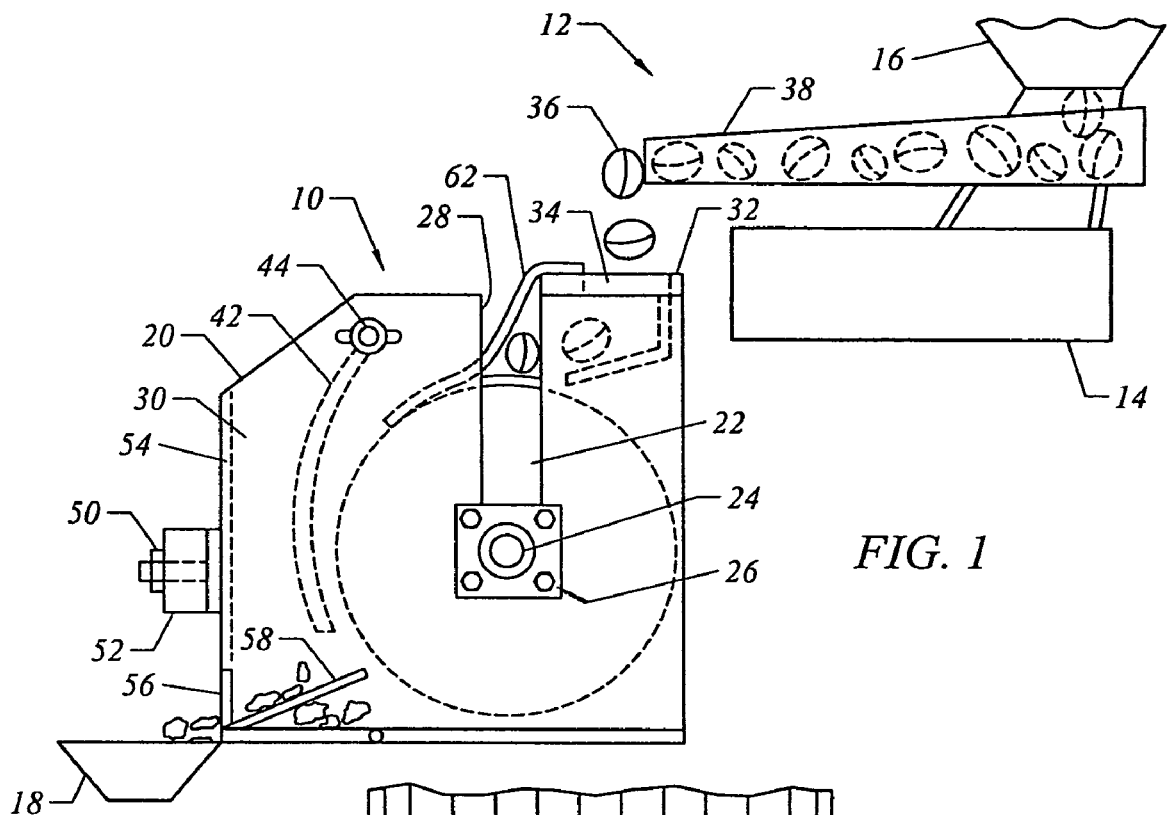
FIG. 1 is a side elevational view of the nut cracking mechanism and a vibratory feed unit.
Figure 2:
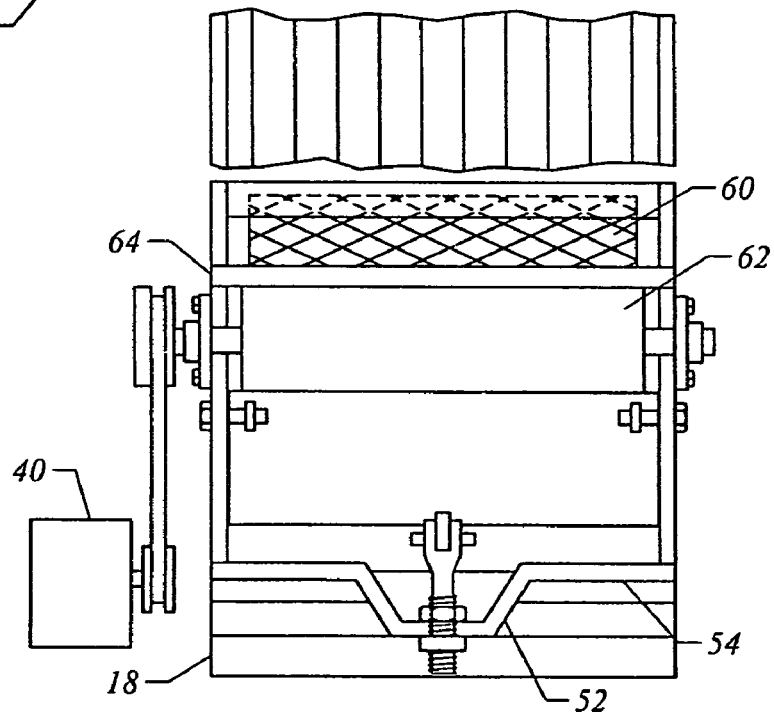
FIG. 2 is a top view of the nut cracking mechanism with a partial, broken view of a feed tray of the vibratory feed unit.

Referring to FIGS. 1 and 2, the nut cracking mechanism 10 is shown as part of a nut cracking system 12 that includes a vibratory feed mechanism 14, a supply hopper 16 and a collection bin 18. It is to be understood that the nut cracking mechanism 10 can be included in a nut shelling operation having different components, and the nut cracking system 12 is illustrated to assist in the description of the nut cracking mechanism which is the primary component of this invention.

The nut cracking mechanism 10 has a structural housing 20 that supports a cracking drum 22 on a shaft 24 supported by bearings 26 at the base of slots 28 in the side walls 30 of the housing 20. The housing 20 has a top 32 with an opening 34 through which nuts 36, shown in phantom, drop from a feed tray 38 of the vibratory feed mechanism 14. The vibratory feed mechanism 14 is supplied by a hopper 16 to continuously feed nuts to the cracking mechanism 10 as the cylindrical drum 22, acting as a feed roller, is rotated by a drive mechanism 40. The drive mechanism 40 is designed to vary the rotation action of the drum 22 to either continuously rotate the drum 22 or rotate the drum 22 with a primary forward and secondary reverse rotation action as desired by the operator to improve the shellings. The net forward motion insures that nuts will advance to a cracking position with shelled nuts and shells being directed to the collection bin 18. The cracking drum functions in part as a feed roller to move nuts to a wedge-shape cracking zone.

Figure 3:
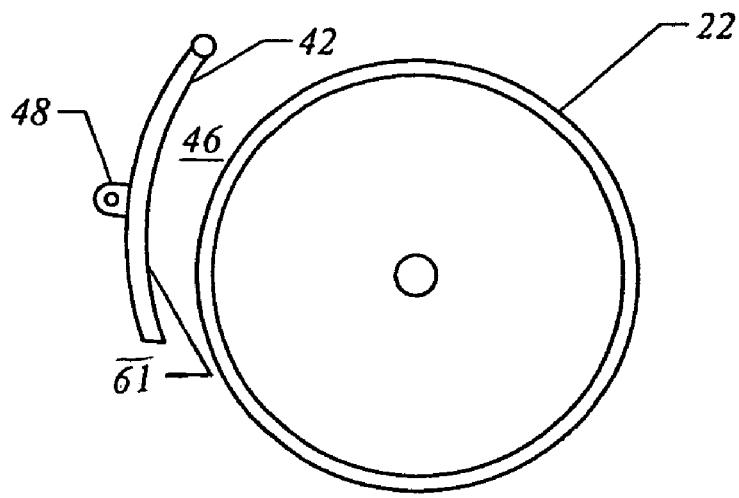
FIG. 3 is a schematic illustration of the roller and compression plate.

Shelling is accomplished by an adjustable compression plate 42, shown also in the schematic view of FIG. 3, that is preferably curved with a cracking 61 surface facing the drum 22. The compression plate is pivotally mounted to the side walls 30 of the housing 20 on pivot screws 44. The curvature of the compression plate 42 has a radius approximately twice that of the drum 22 and is oriented adjacent the drum 22 to form a narrowing gap 46 sized according to the size of the nuts to be cracked. The compression plate 42 has a mount 48 on the back of the plate for an adjustment screw 50 that is rotatably supported by a bracket 52 on an end wall 54 of the housing 20. In this manner, the cracking surface 61 of the compression plate 42 can be adjustably positioned relative to an opposing cracking surface 60 on the drum 22. The end wall 54 has a bottom opening 56 with a guide 58 to direct nuts and shells to the collection bin 18. It is to be understood that in a typical shelling operation, the nut meat and shells are delivered to a separation station where the nut meat is separated from the shells.

Figure 4:
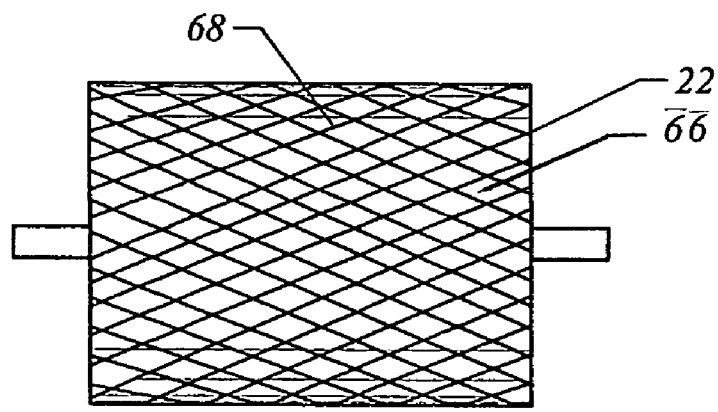
FIG. 4 is a schematic illustration of the roller.
Figure 5:
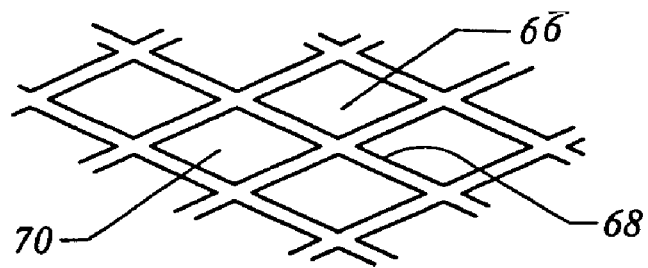
FIG. 5 is an enlarged partial view of the roller screen.

As shown in FIG. 2, the drum 22 has a nonskid nut cracking surface 60 to grip the nut as it drops between the drum 22 and the cracking surface 61 of the substantially vertical compression plate 42. The cracking surface 61 of the compression plate 42 is positioned next to, but not in contact with, the nonskid surface 60 of the drum 22. The cracking surface 61 of the compression plate is not required to be nonskid and preferably should allow some slippage when a nut is conveyed by the drum 22 with its skid resistant surface. A flexible flap 62 is draped over the drum 22 and fastened along one edge to a top plate 64 on the housing 20. This keeps nuts dropped into the housing 20 from popping out and similarly prevents shells and nut meat from flying back when the nuts are compressed and cracked. In the preferred embodiment disclosed, the drum 22 has a surface 66 with a flat screen 68, approximately one-sixteenth inch thick, having elongated diamond shaped openings 70 oriented transversely over the drum 22, as shown in FIG. 4 and in the enlarged view of FIG. 5. In this manner, the oblong nuts are arranged in a sideways orientation and compressed with a slight roll against the compression plate 42. It is to be understood that the drum 22 may be a cast roller with a similar nonskid surface being integral with the casting. This construction improves the ability to clean the roller between shelling operations.

Wherein the foregoing embodiments of the present invention have been set forth in considerable detail for the purposes of making a complete disclosure of the invention, it may be apparent to those of skill in the art that numerous changes may be made in such detail without departing from the spirit and principles of the invention.

The invention claimed is:

1. A nut cracking mechanism comprising:
    a cylindrical drum having an outer nut cracking surface;
    a mounting structure wherein the cylindrical drum is rotatabley supported on a horizontal axis by the mounting structure;
    a compression plate having a plate support wherein the compression plate is mounted on the plate support adjacent to the outer nut cracking surface of the cylindrical drum in a position relative to the outer nut cracking surface of the cylindrical drum wherein the outer nut cracking surface of the cylindrical drum has a radius and the compression plate has a nut cracking surface with a curvature having a radius approximately twice the radius of the cylindrical drum with the nut cracking surface of the compression plate facing an adjacent portion of the outer nut cracking surface of the cylindrical drum wherein a vertical downwardly narrowing gap is formed between the compression plate and the outer nut cracking surface of the cylindrical drum; and
    a drive mechanism that rotates the cylindrical drum relative to the compression plate wherein the portion of the outer nut cracking surface of the cylindrical drum facing the nut cracking surface of the compression plate is rotated in a forward motion to advance nuts to the vertical downwardly narrowing gap for cracking between the outer nut cracking surface of the cylindrical drum and the nut cracking surface of the compression plate.

2. The nut cracking mechanism of claim 1 wherein the mounting structure comprises a housing that contains the cylindrical drum and compression plate in the housing.

3. The nut cracking mechanism of claim 1 wherein the plate support has an adjustment mechanism that operates to displace the compression plate relative to the outer nut cracking surface of the cylindrical drum.

4. The nut cracking mechanism of claim 3 further comprising an adjustment mechanism wherein the adjustment mechanism operates to vary the gap between the compression plate and the outer nut cracking surface of the cylindrical drum.

5. The nut cracking mechanism of claim 4 wherein the adjustment mechanism comprises an adjustment screw between the plate support and the compression plate.

6. The nut cracking mechanism of claim 5 wherein the plate support comprises a housing that contains the cylindrical drum and compression plate wherein the compression plate is mounted to the housing with the nut cracking surface facing the outer nut cracking surface of the drum.

7. The nut cracking mechanism of claim 6 wherein the compression plate is substantially vertical with an upper pivot wherein the pivot mounts to the housing and wherein the compression plate has an adjustment screw connecting the compression plate with the housing wherein the gap between the nut cracking surface of the compression plate and the adjacent portion of the outer nut cracking surface of the cylindrical drum is adjustable.

8. The nut cracking mechanism of claim 7 wherein the housing has a top with an opening and a flexible flap attached to the top next to the opening wherein the flap is draped over the cylindrical drum to prevent nuts and shells from flying back to the opening.

9. The nut cracking mechanism of claim 1 wherein the outer nut cracking surface of the cylindrical drum is smooth with a diamond apertured screen secured to the smooth surface of the cylindrical drum.

10. The nut cracking mechanism of claim 8 in combination with a nut feed mechanism that feeds nuts to the opening of the housing for cracking.

11. The nut cracking mechanism of claim 8 wherein the outer nut cracking surface of the cylindrical drum is skid resistant to prevent slippage of nuts on the cylindrical drum.

12. The nut cracking mechanism of claim 1 wherein the outer nut cracking surface of the cylindrical drum is skid resistant.

13. The nut cracking mechanism of claim 1 wherein the nut cracking surface of the compression plate is smooth and allows slippage of nuts.

14. The nut cracking mechanism of claim 1 in combination with a nut feed mechanism.

15. The nut cracking mechanism of claim 1 wherein the drive mechanism rotates the cylindrical drum with a primary forward and secondary reverse rotation action.

* * * * *